US007162869B2

(12) United States Patent
Yoshino

(10) Patent No.: US 7,162,869 B2
(45) Date of Patent: Jan. 16, 2007

(54) HYDRAULIC SYSTEM FOR A WORK MACHINE

(75) Inventor: Kazunori Yoshino, Kobe (JP)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 0 days.

(21) Appl. No.: 10/690,631

(22) Filed: Oct. 23, 2003

(65) Prior Publication Data

US 2005/0087065 A1 Apr. 28, 2005

(51) Int. Cl.
*F16D 31/02* (2006.01)

(52) U.S. Cl. .......................................... 60/414; 60/468

(58) Field of Classification Search .................. 60/413, 60/414, 428, 468

See application file for complete search history.

(56) References Cited

U.S. PATENT DOCUMENTS 3,922,855 A * 12/1975 Bridwell et al. .............. 60/428
5,673,605 A 10/1997 Chung
6,182,448 B1 * 2/2001 Ohkura et al. ................ 60/494
6,502,393 B1 * 1/2003 Stephenson et al. .......... 60/414
6,655,136 B1 * 12/2003 Holt et al. .................... 60/414
2003/0121258 A1 7/2003 Yoshino

FOREIGN PATENT DOCUMENTS

| | | |
|---|---|---|
| DE | 19709958 | 9/1998 |
| EP | 0232683 | 8/1987 |
| EP | 0629781 | 12/1994 |

* cited by examiner

*Primary Examiner*—F. Daniel Lopez
(74) *Attorney, Agent, or Firm*—Finnegan,Henderson,Farabow,Garrett&Dunner

(57) ABSTRACT

A hydraulic system for a work machine is disclosed. The hydraulic system includes a tank adapted to store a supply of fluid and a source of pressurized fluid in fluid communication with the tank. A first hydraulic actuator and a second hydraulic actuator are in fluid communication with the source of pressurized fluid. A first fluid return line is adapted to direct a return flow of fluid from the first hydraulic actuator to the tank and a second fluid return line is adapted to direct a return flow of fluid from the second hydraulic actuator to the tank. A pressure control device is disposed in the second fluid return line and is operable to selectively adjust a magnitude of fluid pressure in the second fluid return line.

21 Claims, 2 Drawing Sheets

HYDRAULIC SYSTEM FOR A WORK MACHINE

TECHNICAL FIELD

The present invention is directed to a hydraulic system, and, more particularly, to a hydraulic system for a work machine.

BACKGROUND

Work machines are commonly used to move heavy loads, such as, for example, earth, construction material, and/or debris. These work machines, which may be, for example, wheel loaders, excavators, front shovels, motor graders, bulldozers, backhoes, and track loaders, typically include at least two types of power systems, a propulsion system and a work implement system. The propulsion system may be used, for example, to move the work machine around or between work sites and the work implement system may be used, for example, to move a work implement through a work cycle at a job site.

These work machines typically include a hydraulic system that provides power to both the propulsion system and the work implement system. These types of hydraulic systems typically include a series of hydraulic actuators that operate the propulsion system and the work implement system. For example, one or more hydraulic cylinders and/or hydraulic motors may be used to operate the work implement system and one or more hydraulic motors may be used to operate the propulsion system.

A hydraulic actuator in a hydraulic system may be damaged if the hydraulic actuator experiences cavitation. A hydraulic motor, for example, may experience cavitation when the supply fluid flow to the hydraulic motor is less than the return fluid flow from the motor. This situation may occur when the flow of supply fluid to the hydraulic motor is stopped to thereby stop the motion of the hydraulic motor. The inertia within the hydraulic motor may tend to keep the hydraulic motor rotating. In the absence of a supply of make-up fluid flow to the inlet side of the hydraulic motor, the hydraulic motor may experience cavitation. Any such occurrence of cavitation may result in damage to the hydraulic system and, in particular, to the hydraulic actuator that experiences the cavitation. In addition, an occurrence of cavitation may result in the generation of an unpleasant noise.

As shown in U.S. Pat. No. 5,673,605, one approach for reducing cavitation in a hydraulic motor involves placing a back-pressure valve in a fluid return line from the hydraulic motor. The back-pressure valve maintains a certain magnitude of fluid pressure in the fluid return line between the back-pressure valve and the hydraulic motor. This pressurized fluid acts to oppose the motion of the hydraulic motor. Thus, when the supply of fluid to the motor is stopped, the pressure of the fluid in the return line may act to prevent continued motion of the motor and thereby prevent cavitation on the supply side of the hydraulic motor.

However, maintaining a back pressure in the fluid return line may act to reduce the efficiency of the hydraulic motor. The power generated by a hydraulic motor is a function of the pressure differential over the hydraulic motor. Increasing the back pressure against the hydraulic motor will therefore act to reduce the power generated by the hydraulic motor. The reduction in power translates to a reduction in efficiency that may be particularly apparent in situations where the hydraulic motor is operated for a substantial period of time, such as, for example, when the work machine is traveling over a significant distance.

The hydraulic system of the present disclosure solves one or more of the problems set forth above.

SUMMARY OF THE INVENTION

One aspect of the present invention is directed to a hydraulic system that includes a tank adapted to store a supply of fluid and a source of pressurized fluid in fluid communication with the tank. A first hydraulic actuator and a second hydraulic actuator are in fluid communication with the source of pressurized fluid. A first fluid return line is adapted to direct a return flow of fluid from the first hydraulic actuator to the tank and a second fluid return line is adapted to direct a return flow of fluid from the second hydraulic actuator to the tank. A pressure control device is disposed in the second fluid return line and is operable to selectively adjust a magnitude of fluid pressure in the second fluid return line.

In another aspect, the present invention is directed to a method of controlling a hydraulic system on a work machine. Pressurized fluid is supplied to a first hydraulic actuator and to a second hydraulic actuator. A return flow of fluid from the first hydraulic actuator is directed through a first return line to a tank. A return flow of fluid from the second hydraulic actuator is directed through a second return line to the tank. A pressure control device disposed in the second return line is adjusted to selectively adjust a magnitude of fluid pressure in the second return line.

DETAILED DESCRIPTION

Figure 1:
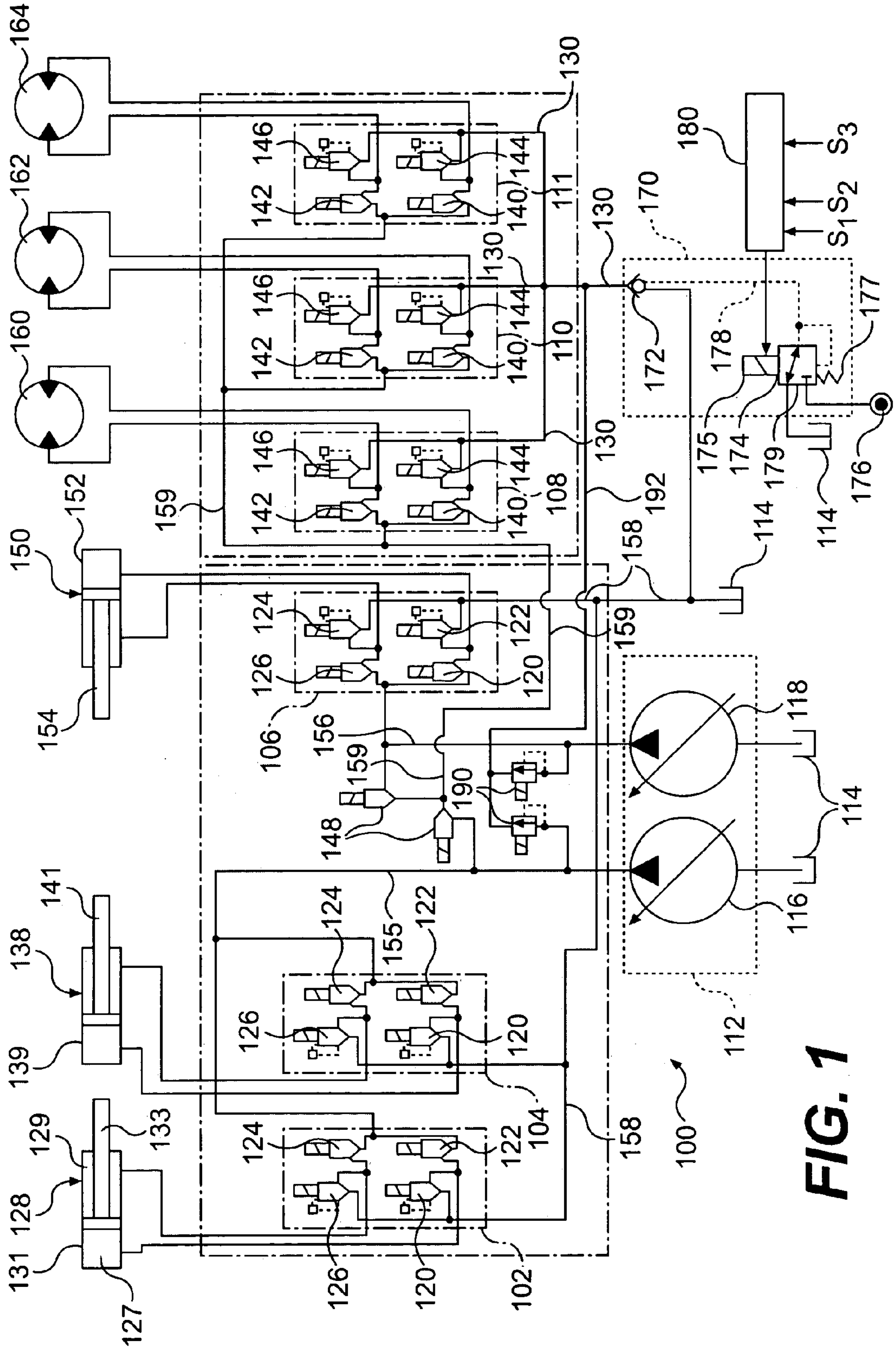
FIG. 1 is a schematic illustration of a hydraulic circuit in accordance with one embodiment of the present invention.

An exemplary embodiment of a hydraulic system 100 for a work machine is illustrated in FIG. 1. The hydraulic system 100 may include a tank 114. Tank 114 is configured to hold a supply of operating fluid. The operating fluid may be any type of fluid commonly used in a hydraulic system.

The hydraulic system 100 may also include a plurality of hydraulic actuators. The hydraulic actuators may be, for example, a series of hydraulic cylinders, a series of hydraulic motors, or a combination of hydraulic cylinders and hydraulic motors. In the embodiment of FIG. 1, hydraulic system 100 includes a series of hydraulic cylinders 128, 138, 150 and a series of hydraulic motors 160, 162, and 164. It is contemplated that hydraulic system 100 may include various other combinations of hydraulic actuators, as is recognized in the art.

Each hydraulic cylinder 128, 138, and 150 includes a housing 131, 139, and 152, respectively, that mounts a piston rod assembly 133, 141, and 154, respectively. The piston rod assembly and housing of hydraulic cylinder 128 define a head end chamber 127 and a rod end chamber 129. Hydraulic cylinders 138 and 150 similarly include a head end chamber and a rod end chamber.

A flow of pressurized fluid may be directed to each hydraulic cylinder 128, 138, and 150 to cause a motion of the respective piston rod assembly within the respective housing. For example, a flow of pressurized fluid may be introduced to the head end 127 of hydraulic cylinder 128 to cause piston rod assembly 133 to move towards rod end chamber 129. Fluid residing in rod end chamber 129 flows from rod end chamber 129 as the movement of piston 133 decreases the volume of rod end chamber 129. The fluid released from the particular hydraulic cylinder may be directed to a fluid return line 158 that leads to tank 114.

Hydraulic system 100 may include a plurality of flow control valve arrangements to control the flow of fluid to and from each hydraulic cylinder 128, 138, and 150. For example, hydraulic system 100 may include a series of independent metering valve arrangements 102, 104, and 106. Valve arrangement 102 may be adapted to control the flow of fluid to and from hydraulic cylinder 128. Valve arrangement 104 may be adapted to control the flow of fluid to and from hydraulic cylinder 138. Valve arrangement 106 may be adapted to control the flow of fluid to and from hydraulic cylinder 128.

Each independent metering valve arrangement 102, 104, and 106, may include a plurality of independently-operated, electronically-controlled metering valves. For example, each independent metering valve arrangement 102, 104, and 106 may include a plurality of metering valves 120, 122, 124, 126. Metering valve 120 controls the flow of fluid from head end chamber 127 to fluid return line 158. Metering valve 122 controls the flow of pressurized fluid from fluid line 155 to head end chamber 127. Metering valve 124 controls the flow of pressurized fluid from fluid line 155 to rod end chamber 129. Metering valve 126 controls the flow of fluid from rod end chamber 129 to tank 114. The metering valves may be spool valves, poppet valves, or any other conventional type of metering valve that may be used to control the rate of fluid flow through a fluid line.

Each hydraulic motor 160, 162, and 164 may be a reversible fluid-driven motor. Pressurized fluid may be introduced to one side of each hydraulic motor 160, 162, and 164 to cause the respective hydraulic motor to rotate in a first direction. Pressurized fluid may be introduced to a second side of the hydraulic motor 160, 162, and 164 to cause the respective hydraulic motor to rotate in the opposite direction. Each hydraulic motor 160, 162, and 164 may selectively release fluid into a fluid return line 130.

Hydraulic system 100 may also include a plurality of flow control valve arrangements to control the flow of fluid to and from each hydraulic motor 160, 162, and 164. For example, hydraulic system 100 may include a series of independent metering valve arrangements 108, 110, and 111. Valve arrangement 108 may be adapted to control the flow of fluid to and from hydraulic motor 160. Valve arrangement 110 may be adapted to control the flow of fluid to and from hydraulic motor 162. Valve arrangement 164 may be adapted to control the flow of fluid to and from hydraulic motor 164.

Each independent metering valve arrangement 108, 110, and 111, may include a plurality of independently-operated, electronically-controlled metering valves. For example, each independent metering valve arrangement 108, 110, and 111 may include a plurality of metering valves 140, 142, 144, and 146. Metering valve 140 controls the flow of pressurized fluid to a first side of the respective hydraulic motor and metering valve 142 controls the flow of pressurized fluid to the second side of the respective hydraulic motor. Accordingly, metering valves 140 and 142 may be referred to as "meter in" valves. Metering valve 144 controls the flow of fluid from the second side of the respective hydraulic motor to fluid return line 130 and metering valve 146 controls the flow of fluid from the first side of the respective hydraulic motor to fluid return line 130. Accordingly, metering valves 144 and 146 may be referred to as "meter out" valves. The metering valves may be spool valves, poppet valves, or any other conventional type of metering valve that may be used to control the rate of fluid flow through a fluid line.

The hydraulic system 100 may also include a source of pressurized fluid 112 that provides pressurized fluid to each hydraulic actuator. Source of pressurized fluid 112 may include a first pump 116 and a second pump 118. Each of first and second pumps 116 and 118 may be, for example, a variable output, high pressure pump or a constant output, high pressure pump. An engine (not shown), or other motive force, may be provided to apply a driving force to power first and second pumps 116 and 118. Each of first pump 116 and second pump 118 may be independently operated to draw fluid from tank 114 and to increase the pressure of the fluid.

Figure 2:
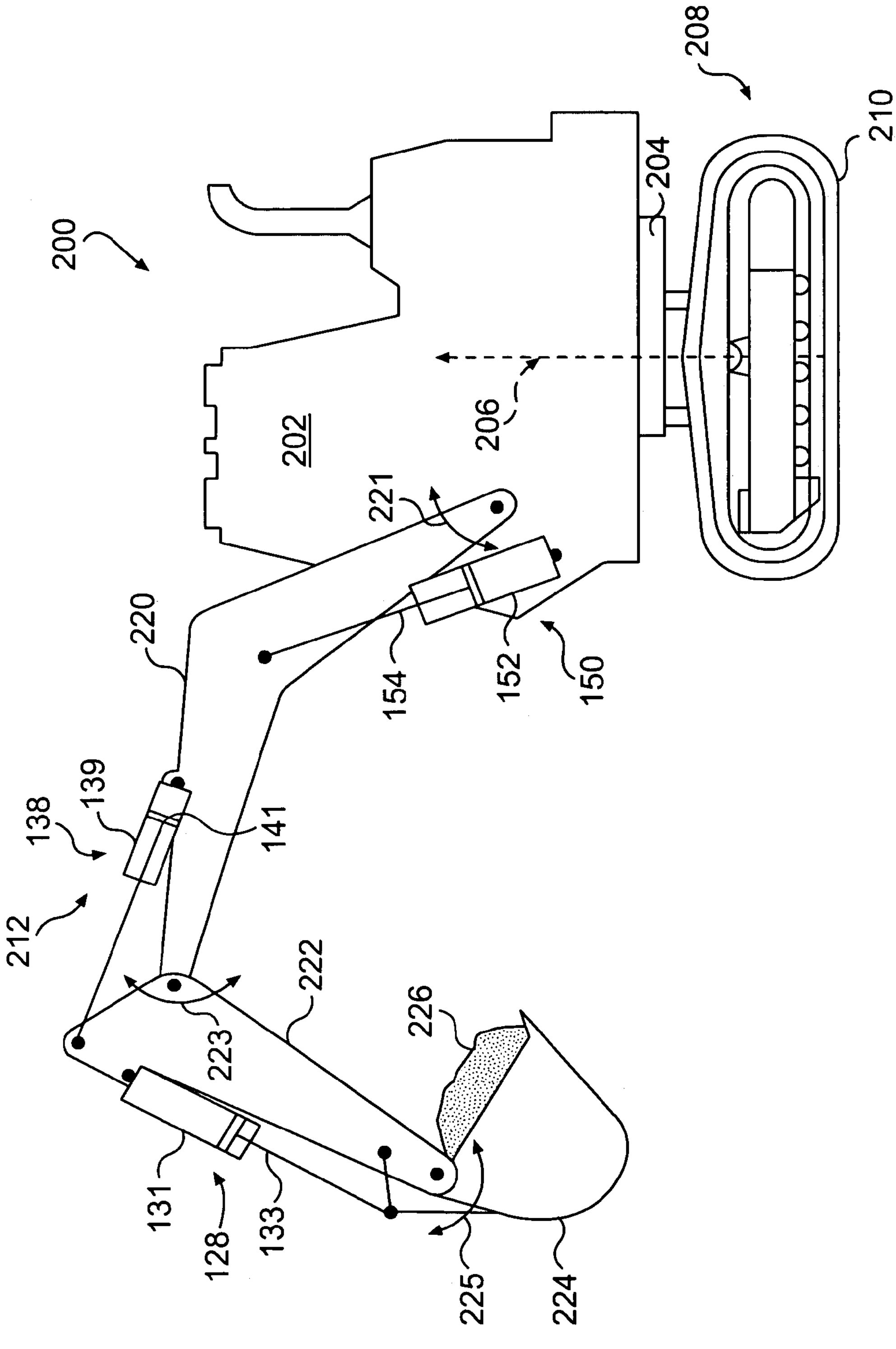
FIG. 2 is a pictorial representation of an exemplary embodiment of a work machine.

First and second pumps 116 and 118 may be connected to the series of hydraulic actuators in many different ways. As described in greater detail below, hydraulic system 100 may be used with a work machine (an exemplary embodiment of which is illustrated in FIG. 2). In the embodiment of hydraulic system 100 illustrated in FIG. 1, first and second pumps 116 and 118 are connected to the series of hydraulic actuators to ensure that a flow of pressurized fluid will be available for each hydraulic actuator based on expected operating conditions of the hydraulic system 100. It is contemplated that various modifications may be made in the fluid connections between source of pressurized fluid 112 and the hydraulic actuators to conform hydraulic system 100 to a different application, such as, for example, another type of work machine.

First pump 116 may be connected to hydraulic cylinders 128 and 138 through fluid line 155. Valve arrangement 102 may be operated to control the flow of pressurized fluid from fluid line 155 to hydraulic cylinder 128. Valve arrangement 104 may be operated to control the flow of pressurized fluid from fluid line 155 to hydraulic cylinder 138. Return flow from each of hydraulic cylinders 128 and 138 maybe directed to tank 114 through fluid return line 158.

Second pump 118 may be connected to hydraulic cylinder 150 through a fluid line 156. Valve arrangement 106 may be operated to control the flow of pressurized fluid from fluid line 156 to hydraulic cylinder 150. Return flow from hydraulic cylinder 150 may be directed to fluid return line 158 to combine with the return flow from hydraulic cylinders 128 and 138 and to return to tank 114.

Hydraulic system 100 may also include a pair of combination relief and bypass valves 190. The combination valves 190 may be operated to relieve pressure from fluid lines 155 and 156 to a fluid line 192. In addition, the combination valves 190 may be operated to by-pass flow from first and second pumps 116 and 118 to fluid line 192. Fluid line 192 may connect to fluid return line 130 to combine the relief or by-pass flow with the return flow from hydraulic motors 160, 162, and 164.

Each of first and second pumps 116 and 118 may also provide pressurized fluid to hydraulic motors 160, 162, and 164. The flow of pressurized fluid from first pump 116 in fluid line 155 may be combined with the flow of pressurized fluid from second pump 118 into a fluid line 159. A pair of flow combiners 148 may be disposed between fluid lines 155 and 156 and fluid line 159. Flow combiners 148 may be operated to control the rate at which pressurized fluid flows from each of fluid lines 155 and 156 to fluid line 159.

Fluid line 159 directs the flow of pressurized fluid to hydraulic motors 160, 162, and 164 through valve arrangements 108, 110, and 111. Valve arrangement 108 may be operated to control the flow of pressurized fluid to hydraulic motor 160. Valve arrangement 110 may be operated to control the flow of pressurized fluid to hydraulic motor 162. Valve arrangement 111 may be operated to control the flow of pressurized fluid to hydraulic motor 164. Return flow from each hydraulic motor 160, 162, and 164 may be directed to fluid return line 130 that leads to tank 114.

A pressure control device 170 may be disposed in fluid return line 130. Pressure control device 170 is adapted to maintain a certain magnitude of pressure in fluid return line 130. Pressure control device 170 may be any type of device that is adapted to vary the magnitude of pressure in fluid return line 130 based on the operation of hydraulic system 100.

For example, pressure control device 170 may include a fluid biased check valve 172. Check valve 172 may be exposed to pressurized fluid from a source of pressurized fluid 176 through a fluid line 178. The magnitude of the fluid pressure in fluid line 178 will determine the pressure at which check valve 172 will open to allow fluid to flow through fluid return line 130 to tank 114. Thus, increasing the magnitude of fluid pressure in fluid line 178 will increase the magnitude of fluid pressure in fluid return line 130. Conversely, decreasing the magnitude of fluid pressure in fluid line 178 will decrease the magnitude of fluid pressure in fluid return line 130.

Pressure control device 170 may include a proportional reducing valve 174 to control the magnitude of pressure within fluid line 178 and thereby control the magnitude of pressure in fluid return line 130. Proportional reducing valve 174 may include a valve element 179. The position of valve element 179 may be adjusted to control the size of an opening within proportional reducing valve 174 to thereby control the magnitude of pressure in fluid line 178. A larger opening in proportional reducing valve 174 between the source of pressurized fluid and the fluid line 178 may result in a greater fluid pressure in fluid line 178. A smaller opening in proportional reducing valve 174 between the source of pressurized fluid and the fluid line 178 may result in a lower fluid pressure in fluid line 178.

Proportional reducing valve 174 may also include a solenoid 175 and a spring 177 that are adapted to act on valve element 179 and control the size of the opening in proportional reducing valve 174. Spring 177 may act to move valve element 179 to a position to fully vent the fluid line 178 to the tank 114. A current may be applied to solenoid 175 to exert a force on valve element 179 to move valve element 179 towards a position at which the tank opening is closed and the connection between the source of pressurized fluid and the fluid line 178 is progressively opened. Increasing the current applied to solenoid 175 may result in an increased force on valve element 179 and a movement of valve element 179 that increases the pressure of the fluid in fluid line 178 in proportion to the increase in applied current. When the current applied to solenoid 175 is decreased, the size of the opening in proportional reducing valve 174 reduces the pressure in fluid line 178 in proportion to the decrease in applied current. Thus, by adjusting the current applied to solenoid 175, the proportional reducing valve 174 may be adjusted to thereby control the magnitude of pressure in fluid line 178 and fluid return line 130.

It should be noted that pressure control device 170 may include any type of valve or other mechanism that is adapted to control the magnitude of fluid pressure in a fluid linen 178. For example, pressure control device 170 may include a variable resistance spring that acts to bias check valve 172 or another type of mechanism.

A controller 180 may be provided to control pressure control device 170. Controller 180 may include a computer, which has all the components required to run an application, such as, for example, a memory, a secondary storage device, and a processor, such as a central processing unit. One skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, CD-ROM, or other forms of RAM or ROM. Controller 180 may further include various other known circuits such as, for example, power supply circuitry, signal conditioning circuitry, and solenoid driver circuitry, among others.

Controller 180 maybe adapted to control the current applied to solenoid 175 of proportional reducing valve 174 based on the operation of hydraulic motors 160, 162, and 164. In certain operating conditions, such as where the possibility of motor cavitation is relatively low, controller 180 may decrease the current applied to solenoid 175 to thereby decrease the magnitude of pressure in fluid return line 130. In other operation conditions, such as where the possibility, of motor cavitation is relatively high, controller 180 may increase the current applied to solenoid 175 to increase the magnitude of pressure in fluid return line 130.

As noted previously, the described hydraulic system 100 may be incorporated in a work machine. An exemplary embodiment of a work machine 200 is illustrated in FIG. 2. Work machine 10 includes a housing 202 that may include a seating area for an operator.

Housing 202 may be mounted on a swing assembly 204 that is configured to rotate or pivot housing 202 about a vertical axis 206. Swing assembly 204 may be powered by a hydraulic actuator, such as, for example, fluid motor 164 (referring to FIG. 1). Valve arrangement 111 may control the flow of pressurized fluid to fluid motor 164 to thereby control the direction and velocity of movement of swing assembly 204.

Housing 202 and swing assembly 204 may be supported by a traction device 208. Traction device 208 may be any type of device that is adapted to provide for movement of work machine 200 around a job site and/or between job sites. For example, traction device 208 may include a pair of tracks 210 (only one of which is illustrated in FIG. 2). Each track 210 may be powered by a hydraulic actuator, such as, for example, one of fluid motors 160 and 162 (referring to FIG. 1). Valve arrangement 108 may control the flow of pressurized fluid to fluid motor 160 to thereby control the direction and velocity of movement of one track. Valve arrangement 110 may control the flow of pressurized fluid to fluid motor 162 to thereby control the direction and velocity of movement of the second track.

Work machine 200 may also include a work implement linkage 212 that operatively mounts a ground engaging tool 224. Work implement linkage 212 may include a boom 220. Boom 220 may be pivotally mounted on housing 202 for movement in the directions indicated by arrow 221. In another exemplary embodiment, boom 220 may be mounted directly on swing assembly 204 and housing 202 may be fixed relative to traction device 208. In this alternative embodiment, swing assembly 204 would allow boom to pivot about a vertical axis relative to housing 202.

Boom 220 may pivotally mount a stick 222 for movement in the directions indicated by arrow 223. Stick 222 may operatively mount ground engaging tool 224 for movement in the directions indicated by arrow 225. Ground engaging tool 224 may be any type of mechanism commonly used on a work machine to move a load 226 of earth, debris, or other material. For example, ground engaging tool 224 may be a shovel, a bucket, a blade, or a clamshell.

Work implement linkage 212 may be powered by a series of hydraulic actuators, such as, for example, hydraulic cylinders 128, 138 and 150 of hydraulic system 100 (referring to FIG. 1). Housing 152 of hydraulic cylinder 150 may be connected to housing 202 and piston rod assembly 154 of hydraulic cylinder 150 may be connected to boom 220. Valve arrangement 106 may control the flow of fluid to and from hydraulic cylinder 150 to thereby control the motion of boom 220.

Hydraulic cylinders 138 and 128 may power the movement of stick 222 and ground engaging tool 224, respectively. Housing 139 of hydraulic cylinder 138 may be connected to boom 220 and piston rod assembly 141 of hydraulic cylinder 138 may be connected to stick 222. Valve arrangement 104 may control the flow of fluid to and from hydraulic cylinder 138 to thereby control the motion of stick 222 relative to boom 220. Similarly, housing 131 of hydraulic cylinder 128 may be connected to stick 222 and piston rod assembly 133 of hydraulic cylinder 128 maybe connected to ground engaging tool 224. Valve arrangement 102 may control the flow of fluid to and from hydraulic cylinder 128 to thereby control the motion of ground engaging tool 224 relative to stick 222.

Controller 180 (referring to FIG. 1) may be adapted to provide controlling signals to each valve arrangement 102, 104, 106, 108, 110, and 111 based on input received from an operator. The controlling signals may be adapted to move metering valves within each of the valve arrangements to control the flow of fluid to and from each hydraulic actuator. In this manner, controller 180 may generate the particular movement or action desired by the operator.

Controller 180 may monitor the operation of the hydraulic actuators in hydraulic system 100 to identify situations where the one of the hydraulic actuators may experience cavitation. For example, controller 180 may receive a series of signals, $S_1$, $S_2$, and $S_3$ that provide an indication of the current operating characteristics of hydraulic motors 160, 162, and 164. Signals $S_1$, $S_2$, and $S_3$ may represent, for example, the fluid flow rates exiting each hydraulic motor, the rotating speed of each hydraulic motor, the power output of each hydraulic motor, or any other relevant operating characteristic.

Controller 180 may process signals $S_1$, $S_2$, and $S_3$ to identify the potential for cavitation in hydraulic system 100. In response to an increased risk of cavitation, controller 180 may adjust pressure control device 170 to increase the magnitude of fluid pressure in fluid return line 130. In response to a decreased risk of cavitation, controller 180 may adjust pressure control device 170 to decrease magnitude of fluid pressure in fluid return line 130.

In the embodiment of FIG. 1, pressure control device 170 is adapted to reduce the possibility of cavitation in hydraulic motors 160, 162, and 164. It is contemplated, however, that pressure control device 170 may be further adapted to prevent cavitation in hydraulic actuators 128, 138, and 150. This may be accomplished, for example, by providing a fluid connecting line between return line 158 and fluid return line 130. A control valve (not shown) may be positioned in this fluid connecting line to direct all or a portion of the return flow from the hydraulic actuators 128, 138, and 150 to fluid return line 130. In this manner, pressure control device 170 may be used to control a magnitude of back pressure to one or more of hydraulic actuators 128, 138, and 150.

Hydraulic motors 160, 162, and 164 may have a higher risk of cavitation when the flow of fluid through fluid return line 130 is relatively low. This may occur, for example, when only one of hydraulic motors 160, 162, or 164 is active and is being stopped from rotating. Due to heavier leakage, ample make-up fluid may not be available. In this situation, controller 180 may operate pressure control device 170 to increase the magnitude of fluid pressure in fluid return line 130. When the fluid flow to the operating hydraulic motor 160, 162, or 164 is stopped, the higher back pressure in fluid return line 130 may act through the meter-out valve to provide the needed make-up fluid.

Hydraulic motors 160, 162, and 164 may have a lower risk of cavitation when the flow of fluid through fluid return line 130 is relatively high. This may occur, for example, when more than one hydraulic motor 160, 162, and 164 is active, such as when work machine 200 is traveling over a distance. In addition, the flow of fluid through fluid return line 130 may be relatively high when source of pressurized fluid 112 is providing a by-pass or relief flow of fluid to fluid return line 130 through fluid line 192. In this situation, controller 180 may operate pressure control device 170 to decrease the magnitude of fluid pressure in fluid return line 130. The reduced magnitude of fluid pressure in fluid return line 130 may result in an increased efficiency of the operating hydraulic motors.

INDUSTRIAL APPLICABILITY

The hydraulic system described above may be used to reduce the possibility of cavitation associated with the operation of one or more hydraulic actuators in hydraulic system 100. The return flow of fluid from some of the hydraulic actuators, such as, for example, hydraulic motors 160, 162, and 164 may be directed through pressure control device 170. The return flow of fluid from other hydraulic actuators, such as, for example, hydraulic cylinders 128, 138, and 150 may be directed directly to tank 114. Pressure control device 170 may be adjusted to increase the magnitude of pressure in fluid return line 130 to thereby increase the back pressure exerted on the hydraulic motors 160, 162, and 164 when the possibility of cavitation is increased. The magnitude of pressure in fluid return line 130 may be reduced to reduce the magnitude of back pressure when the possibility of cavitation is decreased.

The variability of pressure control device 170 may increase the efficiency of the hydraulic actuators in hydraulic system 100. The reduction in pressure in fluid return line 130 under certain situations may increase the efficiency of hydraulic system 100. In addition, directing the return flow of fluid from hydraulic actuators 128, 138, and 150 directly to tank may also increase the efficiency of hydraulic system 100.

Pressure control device 170 of the described hydraulic system 100 may also be used to improve control over other aspects of hydraulic system 100. For example, as the unload flow from source of pressurized fluid 112 is directed through pressure control device 170, the pressure control device may be operated to regulate the unload pressure for source of pressurized fluid 112. Other such control aspects may be apparent to one skilled in the art.

The hydraulic system 100 described herein may be used in connection with a work machine 200. While the hydraulic system 100 has been described in connection with an excavator (see FIG. 2), it is contemplated that hydraulic system may be used with any type of work machine. For example, work machine 200 may be a wheel loader, a front shovel, a motor grader, a bulldozer, a backhoe, or a track loader.

It will be apparent to those skilled in the art that various modifications and variations can be made in the hydraulic system of the present disclosure without departing from the scope of the disclosure. Other embodiments may be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A hydraulic system, comprising:

a tank adapted to store a supply of fluid;

a source of pressurized fluid in fluid communication with the tank;

a first hydraulic actuator in fluid communication with the source of pressurized fluid;

a second hydraulic actuator in fluid communication with the source of pressurized fluid;

a first fluid return line adapted to direct a return flow of fluid from the first hydraulic actuator to the tank;

a second fluid return line adapted to direct a return flow of fluid from the second hydraulic actuator to the tank; and a pressure control device disposed in the second fluid return line and operable to selectively adjust a magnitude of fluid pressure in the second fluid return line, wherein the pressure control device is configured to receive a signal representing a sensed rate of fluid flow through the second return line and increases the magnitude of the fluid pressure in the second fluid return line in response to a decrease in the sensed rate of fluid flow through the second return line, and wherein the pressure control device includes a check valve disposed in the second fluid return line and a proportional reducing valve adapted to control the magnitude of fluid pressure in the second fluid return line.

2. The hydraulic system of claim 1, wherein the first hydraulic actuator is a hydraulic cylinder and the second hydraulic actuator is a hydraulic motor.

3. The system of claim 2, further including:

a first set of independent metering valves adapted to control a flow of fluid between the source of pressurized fluid and the hydraulic cylinder and to control a flow of fluid from the hydraulic cylinder to the first fluid return line; and a second set of independent metering valves adapted to control a flow of fluid between the source of pressurized fluid and the hydraulic motor and to control a flow of fluid from the hydraulic motor to the second fluid return line.

4. The hydraulic system of claim 2, further including a plurality of hydraulic cylinders and a plurality of hydraulic motors.

5. The system of claim 1, further including a controller adapted to adjust the pressure control device to thereby adjust the magnitude of fluid pressure in the second fluid return line.

6. The system of claim 1, further including a second source of pressurized fluid in fluid connection with the pressure control device.

7. The system of claim 1, further including a by-pass line connecting the source of pressurized fluid with the second return line to direct a flow of fluid from the source of pressurized fluid to the pressure control device.

8. The system of claim 7, further including a by-pass valve disposed in the by-pass line and operable to control a rate at which the flow of fluid flows through the by-pass line.

9. The system of claim 1, wherein the source of pressurized fluid includes a first pump and a second pump.

10. A method of controlling a hydraulic system on a work machine;

supplying pressurized fluid to a first hydraulic actuator and to a second hydraulic actuator;

directing a return flow of fluid from the first hydraulic actuator through a first return line to a tank;

directing a return flow of fluid from the second hydraulic actuator through a second return line to the tank;

sensing a rate of fluid flow through, the second return line;

adjusting a pressure control device disposed in the second return line to selectively adjust a magnitude of fluid pressure in the second return line, the pressure control device having a check valve disposed in the second fluid return line and a proportional reducing valve adapted to control the magnitude of fluid pressure in the second fluid return line, and increasing the magnitude of the fluid pressure in the second return line in response to a decrease in the sensed rate of fluid flow through the second return line.

11. The method of claim 10, wherein the second hydraulic actuator is a hydraulic motor and further including controlling a flow of fluid to the hydraulic motor to thereby control the motion of a swing assembly.

12. The method of claim 11, further including adjusting the pressure control device in response to a change in the operation of the swing assembly.

13. The method of claim 12, further including adjusting the pressure control device in response to a change in an operation of a second hydraulic motor associated with a first traction device and to a change in an operation of a third hydraulic motor associated with a second traction device.

14. The method of claim 11, further including decreasing the magnitude of the fluid pressure in the second return line in response to an increase in the rate of fluid flow through the second return line.

15. A work machine, comprising:

a work implement linkage;

at least one hydraulic cylinder connected to the work implement linkage and adapted to move the work implement linkage;

a swing assembly mounting the work implement linkage;

a hydraulic motor connected to the swing assembly and adapted to rotate the swing assembly to thereby rotate the work implement linkage;

a tank adapted to store a supply of fluid;

a source of pressurized fluid in fluid communication with the tank and adapted to supply pressurized fluid to the at least one hydraulic cylinder and to the hydraulic motor;

a first fluid return line adapted to direct a return flow of fluid from the hydraulic cylinder to the tank;

a second fluid return line adapted to direct a return flow of fluid from the hydraulic motor to the tank; and a pressure control device disposed in the second fluid return line and operable to selectively adjust a magnitude of fluid pressure in the second fluid return line, wherein the pressure control device increases the magnitude of the fluid pressure in the second fluid return line in response to a decrease in a rate of fluid flow through the second return line.

16. The work machine of claim 15, further including:

a first set of independent metering valves adapted to control a flow of fluid between the source of pressurized and the hydraulic cylinder and to control a flow of fluid from the hydraulic cylinder to the first fluid return line; and a second set of independent metering valves adapted to control a flow of fluid between the source of pressurized and the hydraulic motor and to control a flow of fluid from the hydraulic motor to the second fluid return line.

17. The work machine of claim 15, further including:

a plurality of hydraulic cylinders associated with the work implement linkage;

a traction device having a first track and a second track;

a second hydraulic motor associated with the first track; and a third hydraulic motor associated with the second track.

18. The work machine of claim 17, further including a controller adapted to adjust the pressure control device to thereby adjust the magnitude of fluid pressure in the second fluid return line based on the operation of at least one of the swing assembly and the traction device.

19. The work machine of claim 15, wherein the pressure control device includes a check valve disposed in the second fluid return line and a proportional reducing valve adapted to control the magnitude of fluid pressure in the second fluid return line.

20. The work machine of claim 17, further including a second source of pressurized fluid in fluid connection with the pressure control device.

21. The work machine of claim 15, further including:

a by-pass line connecting the source of pressurized fluid with the second return line to direct a flow of fluid from the source of pressurized fluid to the pressure control device; and a by-pass valve disposed in the by-pass line and operable to control a rate at which the flow of fluid flows through the by-pass line.

* * * * *